(12) United States Patent
Daheim

(10) Patent No.: US 9,766,103 B2
(45) Date of Patent: Sep. 19, 2017

(54) MEASURING DEVICE, MEASURING ARRANGEMENT AND METHOD FOR DETERMINING A MEASURED QUANTITY

(71) Applicant: KROHNE Messtechnik GmbH, Duisburg (DE)

(72) Inventor: Michael Daheim, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 471 days.

(21) Appl. No.: 13/751,872

(22) Filed: Jan. 28, 2013

(65) Prior Publication Data

US 2014/0116130 A1 May 1, 2014

(30) Foreign Application Priority Data

Oct. 31, 2012 (DE) .......................... 10 2012 021 312

(51) Int. Cl.
*G01F 23/00* (2006.01)
*G01F 1/24* (2006.01)
*G01D 3/036* (2006.01)

(52) U.S. Cl.
CPC ............. *G01F 1/24* (2013.01); *G01D 3/0365* (2013.01); *G01F 23/0061* (2013.01)

(58) Field of Classification Search
CPC ..................................... G01F 1/28; G01F 1/24
See application file for complete search history.

(56) References Cited

U.S. PATENT DOCUMENTS

| | | | |
|---|---|---|---|
| 6,002,996 A | 12/1999 | Burks et al. | |
| 6,768,374 B1 * | 7/2004 | Lee | H03F 3/005 327/124 |
| 7,436,100 B2 * | 10/2008 | D'Angelico | G01F 23/2967 310/316.03 |
| 7,440,735 B2 | 10/2008 | Karschnia et al. | |
| 8,010,312 B2 | 8/2011 | Höcker | |
| 8,065,912 B2 | 11/2011 | Spanke | |
| 2010/0236646 A1 * | 9/2010 | Anzai et al. | 137/551 |

FOREIGN PATENT DOCUMENTS

| | | |
|---|---|---|
| DE | 102 60 959 A1 | 7/2004 |
| DE | 10 2006 016 381 A1 | 10/2007 |
| DE | 10 2011 006 989 A1 | 10/2012 |

\* cited by examiner

*Primary Examiner* — Paul West
*Assistant Examiner* — Mark A Shabman
(74) *Attorney, Agent, or Firm* — David S. Safran

(57) ABSTRACT

A measuring device, measuring arrangement and a method for determining a measured quantity. The measuring device a sensor device, an evaluation device and an interface. The sensor device generates measurement information which is dependent on the measured quantity and the evaluation device determines a result value for the measured quantity. To devise a measuring device which manages with a limited power demand and storage demand and which also allows a complex evaluation for obtaining the result value for the measured quantity, the evaluation device of the measuring device outputs the measurement information or information dependent on it via the interface to a separate data device of the measuring arrangement, receives intermediate information from the data device which is generated depending on the measurement information or the information dependent on it and determines the result value based on the intermediate information.

4 Claims, 2 Drawing Sheets

MEASURING DEVICE, MEASURING ARRANGEMENT AND METHOD FOR DETERMINING A MEASURED QUANTITY

BACKGROUND OF THE INVENTION

Field of the Invention

The invention relates to a measuring device for determining at least one measured quantity with at least one sensor device, at least one evaluation device and at least one interface. Here, the sensor device generates at least measurement information which is dependent on the measured quantity and the evaluation device determines at least one result value for the measured quantity. Furthermore, the invention relates to a measuring arrangement with at least one measuring device for determining at least one measured quantity and with at least one data device which is separate from the measuring device. Here, the measuring device likewise generates at least measurement information which is dependent on the measured quantity and determines at least one result value for the measured quantity. Furthermore, the measuring device and the data device are at least temporarily connected to one another. Moreover, the invention relates to a method for determining at least one measured quantity. The measured quantity is, for example, the flow rate, the liquid level, the pH value or the temperature of a medium.

Description of Related Art

In modem process automation, a plurality of measuring instruments is used to determine or to monitor measured quantities in order to monitor or control processes. In many measurements, specific information about the measurement medium, about the process, and in general, the background conditions is necessary. Occasionally, secondary measured quantities must also be considered since the quantity which has been determined directly during the measurement has several dependencies on different variable state quantities. In this respect, larger storage units for storing of parameters or information are optionally necessary. Furthermore, the computation formulas and evaluation algorithms which are necessary for achieving measurements that are as accurate as possible can be complex to use.

For example, if the flow rate of a flowable medium is being determined, depending on the measurement principle, for high precision measurements, the viscosity of the medium must also be included in the examination or evaluation. The same applies to the density of the medium when there is to be conversion between mass flow rate and volumetric flow rate measurements.

The implementation of complex computations or enabling large data storages increases the costs of the measuring devices and may collide with the application. In particular, measurements in areas at risk of explosion necessitate a limitation of the energy which is available for the measuring device. However, this runs counter to the fact that the implementation of longer algorithms with frequent data access to memory units is generally associated with an increased power demand.

German Patent Application DE 10 2006 016 381 A1 shows a measuring arrangement with at least one measuring instrument and an evaluation device which is arranged and configured separately from the measuring instrument. The measuring instrument generates a raw value from which the evaluation device determines the measured value. In one configuration, the evaluation device has access to an additional measuring instrument. The determined measured value is displayed by the measuring instrument via a display unit which belongs to the measuring instrument. The measuring instrument is therefore used to generate a raw value and to display the measured value obtained therefrom by a separate device.

A liquid level measuring instrument which can be used for any applications is described in German Patent Application DE 102 60 959 A1 and corresponding U.S. Pat. No. 8,065,912. A memory stores a plurality of parameter sets which are suitable for the different applications. An evaluation unit accesses the pertinent parameter set and computes the liquid level from the actual measurement signal.

SUMMARY OF THE INVENTION

Therefore, a primary object of this invention is to devise a measuring device, and in addition to a corresponding measuring arrangement, also a method for determining a measured quantity which manages with a limited power and storage demand and which also allows a complex evaluation for obtaining the result value for the measured quantity.

The measuring device in accordance with the invention in which the aforementioned object is achieved is, first of all, essentially characterized in that the evaluation device outputs the measurement information or information dependent on it via an interface, that the evaluation device via the interface receives at least intermediate information which is generated depending on the measurement information or the information dependent on it and that the evaluation device determines the result value depending on the intermediate information.

The measuring device in accordance with the invention generates measurement information which depends on the measured quantity to be determined and from which also a result value can be determined as a measured value for the measured quantity. This determination does not take place completely in a measuring device and not completely in a unit which is separate from the measuring device, but the measuring device based on the measurement information from a separate device acquires intermediate information with which the measuring device continues to compute and ultimately determines the measured value. Part of the measured value determination is essentially relocated to the outside in this way. An advantage consists in that, in this way, the measuring device can have a relatively simple and compact structure. The energy demand for optionally complex computations is thus relocated from the process domain to the outside into a safe domain.

For data communication, the measuring device has an interface which, in one configuration, allows also the connection to the Internet so that, in this configuration, the measuring device can also process or generate the data or information or signals accordingly. The connection to the outside can also be optionally produced only for certain time intervals.

The aforementioned object according to another teaching of the invention for the initially named measuring arrangement is achieved in that the evaluation device outputs the measurement information or information dependent on it to the data device. The data device determines intermediate information which is dependent on the measurement information or the information which is dependent thereon, which intermediate information is received by the evaluation device. Finally, the evaluation device determines the result value depending on the intermediate information. The aforementioned details about the measuring device in accordance with the invention applies, accordingly, also to the measuring arrangement and the explanations of the measuring arrangement apply accordingly also to the measuring device which is especially a part of the measuring arrangement.

The measuring arrangement in accordance with the invention which allows the determination of at least one measured quantity is composed at least of one actual measuring device and a data device. The measuring device is designed for the measurement of the measured quantity, and based on measurement information, as the primary or raw value, allows the determination—especially the computation—of the event value as a value which is to be output as a measured value for the measurement. For the determination, there is a data device which is characterized, for example, by a larger data storage or higher level processor compared to the measuring device. Alternatively, the data device for the computation is of higher level than the measuring device in that the data device is located in a region which is not subject to any power limitation. These power limitations are conventional, for example, in an application within zones at risk of explosion. For determining the result value, the measurement information is generated by the measuring device, transferred to the data device and processed there into intermediate information. This intermediate information is then used, in turn, by the measuring device for determining the event value.

In one configuration of the measuring arrangement, there is at least one secondary sensor device which produces at least secondary measurement information. This additional information can increase the measurement accuracy for the measured quantity which is to be determined by dependencies on this secondary measured quantity being included in the determination of the result value or by the same measured quantity being renewed for monitoring or for compensation and being optionally determined with another measurement method.

In one configuration, the secondary measurement information is therefore transferred from the secondary sensor device to the data device. Connection problems and interrogation are therefore also relocated from the measuring device to the data device and the associated greater possibilities.

In one configuration, the data device is made such that it determines the intermediate information at least depending on the secondary measurement information. In this configuration the data device virtually computes the measurement information with the secondary measurement information in order to generate the intermediate information from it. Alternatively, the data device transfers the secondary measurement information, or optionally information dependent on it, to the measuring device so that it determines the result value with it and with the intermediate information.

The aforementioned object is achieved according to an additional teaching of the invention in the initially named method for determining at least one measured quantity by a method which encompasses at least the following steps: At least measurement information which is dependent on the measured quantity is generated by the measuring device. The measurement information or information dependent on it is transferred from the measuring device to a data device which is separate from the measuring device. At least intermediate information is determined by the separate data device based on the measurement information or the information which is dependent on it. Subsequently, a result value for the measured quantity is determined by the measuring device at least based on at least intermediate information.

The method for determining a measured quantity in the transition from the directly determined measurement information as the primary raw measured value in which the measured quantity of actual interest is reflected to the result value for the determined or measured measurement quantity uses an intermediate step by intermediate information being determined and being made available to the measuring device by a data device based on the measurement information or information dependent on it which originates for example, by preprocessing of the measurement information from the measuring device. The intermediate information which is based, for example, on more complex algorithms or computations or is necessary for access to larger data sets is then used by the measuring device for determining the result value.

The aforementioned details about the measuring device in accordance with the invention and the measuring arrangement also apply accordingly here for the method and the explanations and configurations of the method also apply accordingly to the measuring device and the measuring arrangement.

In one configuration of the method in accordance with the invention, a secondary sensor device produces at least secondary measurement information. In this configuration, more information about the medium to be measured and the process or space etc. to be measured is obtained by a secondary sensor device. This is used, for example, to increase the measurement accuracy or to carry out a plausibility examination. For example, if the level of a medium is being continuously measured by means of a measuring device which uses the radar principle, the secondary sensor device is made, for example, as a boundary level switch. Alternatively, the secondary sensor device is used to generate secondary measurement data which are used for resolution of the dependency of the (primary) measured quantity on this secondary measured quantity. Thus, for example, the temperature dependency of the (primary) measured quantity can be considered by the measurement of the temperature.

The measurement of the secondary measured quantity is used by the intermediate information being determined based on the secondary measurement information and based either on the measurement information or on the information dependent on it, in one configuration. In another configuration the result value is determined based on the secondary measurement information and the intermediate information.

In particular, there is a host of possibilities for embodying and developing the measuring device in accordance with the invention, the measuring arrangement in accordance with the invention, and the method in accordance with the invention. In this regard reference is made to the following description of exemplary embodiments in conjunction with the accompanying drawings.

DETAILED DESCRIPTION OF THE INVENTION

Figure 1:
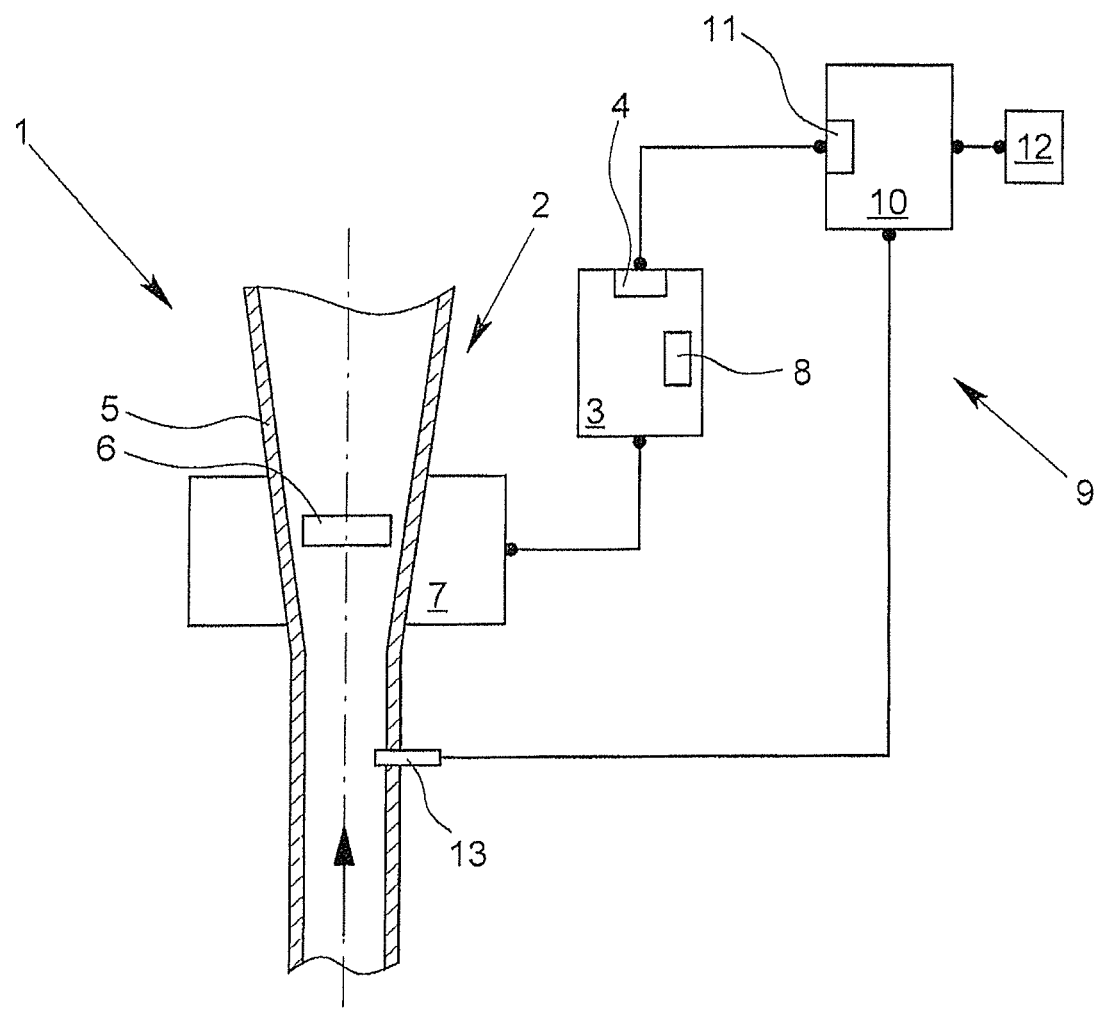
FIG. 1 is a schematic block diagram of a measuring arrangement in accordance with the invention essentially showing functionally active relationships and FIG. 2 is a schematic flow chart of an exemplary configuration of the steps of the inventive method.
Figure 2:
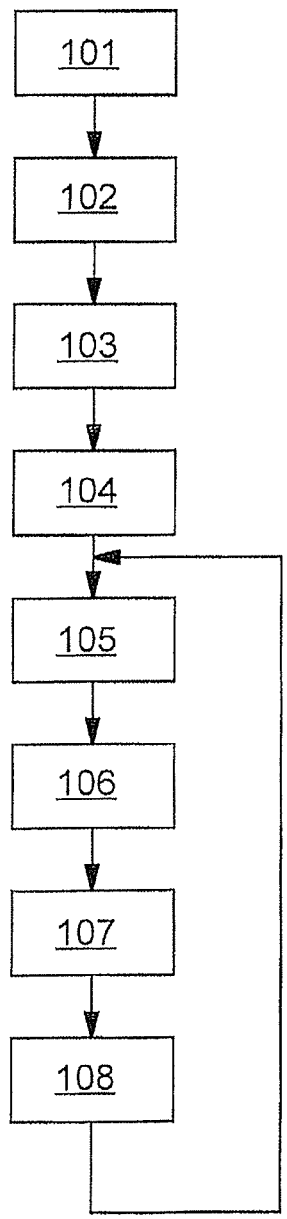

FIG. 1 shows an exemplary embodiment of a measuring device 1 forming part of a measuring arrangement 9, the figure not being a representation in the sense of a correct electrical wiring diagram, but rather is intended to allow the active relationships between the different components of the measuring arrangement 1 to be recognizable. FIG. 2 additionally shows the progression of steps of the method for determining a measured quantity.

The block diagram of FIG. 1 shows, a measuring arrangement 1 with a sensor device 2 which is used to measure the flow rate of a medium (indicated by the arrow) according to the plummet principle, The sensor device 2 is connected to an evaluation device 3 which, based on measurement information of the sensor device 2, determines or specially computes a result value—therefore especially the measured value—for the measured quantity, in this case, flow rate. The measurement information is therefore a raw value or a primary measured value which yields the flow rate.

To proceed from the raw value of the measurement to the flow rate, other data as information about the measurement medium and other computation steps are necessary. Thus, for example, the viscosity of the measurement medium is included as a relevant quantity in the determination of the flow rate.

The amount of data or the possibly computation-intensive relationships between the individual quantities are a problem in this dependency on the variables of the medium and/or environment/process depending on the measurement principle or the type of application. On the one hand, these demands can be met by a corresponding choice of the components; however, this can be costly. On the other hand, either the application to individual media or ambient conditions can be restricted or the measurement accuracy is reduced by corresponding simplifications in the evaluation. Difficulties can arise in the computations especially when the measuring device is located, for example, in a region at risk of explosion so that there is a limitation of the energy supply. More complex computations—at the existing energy limitation—therefore, can lead to a distinct prolongation of the duration of the computation; this generally opposes a certain demand for prompt real-time measured values.

The data about the viscosity of the different media and also the correction with respect to the temperature dependency of the viscosity are therefore not completely retained or considered in the measuring device 1 itself in the illustrated configuration, but are stored externally or are computed externally outside the measuring device 1. For data exchange, the evaluation device 3 has an interface 4 which, for example, allows the connection to a field bus line or to the Internet, or in general, to the units which are separate from the measuring device 1.

The sensor device 2 comprises a measuring tube 5 through which the measurement medium flows and which has a conically widening diameter, especially in sections. There is a plummet 6 horizontally movable in the measuring tube 5. The plummet 6 is raised horizontally by the buoyancy and by the medium flowing past it and is pressed down by the force due to weight. After a transient phase, the plummet 6 pauses at a height which allows a conclusion about the flow rate of the medium. This position is magnetically tapped here, for example, via the detection device 7 (this position determination is described, for example, in German Patent DE 196 39 060 C2 and U.S. Pat. No. 6,079,279). The detection device 7 based on the measurement generates measurement information which depending on the configuration is a primary raw measured value or a raw measurement signal. In the illustrated configuration the measurement information is the specification of the height of the plummet 6.

The relationship between the height value and the flow rate is determined, among other characteristics, by the shape of the plummet 6, the shape of the measuring tube 5 and especially also by the viscosity of the measurement medium. Mainly for the latter dependency, if the use of the measuring device 1 is not limited to certain media, it is necessary to store a larger number of calibration data for a plurality of media. This may impose major demands on the memory unit 8 of the measuring device 1, which unit is made here as part of the evaluation device 3. Furthermore, the temperature dependency of the viscosity must also be considered.

In order to increase the measurement accuracy, and thus, to determine more reliable result values, the measuring device 1 is incorporated in a measuring arrangement 9 which expands the possibilities of the measurement and resolves the aforementioned problems.

The evaluation device 3 is connected to a data device 10 via the interface 4. The connection can be continuous or only temporary and is used especially for data exchange. The connection is made especially bidirectional here. The data device 10 is located preferably outside the process environment so that in particular there are no energy restrictions or space limitations. In one configuration it is especially a server which can be reached via an Internet connection. The data device 10 has a data device interface 11 which is used for communication with the evaluation device 3. Furthermore the data device 10 has a data memory 12 which is separately configured here and in which several calibration curves or parameter sets for different medium are stored.

For considering the temperature dependency of the viscosity of the medium, there is in addition, a secondary sensor device 13 which is made here as a temperature sensor and which measures the temperature of the measurement medium. The secondary sensor device 13 is connected to the data device 10 which, based on the temperature of the medium as secondary measurement information, selects the appropriate calibration data and from the measurement information of the measuring device 1, determines and especially computes the intermediate information. The intermediate information in one version is an individual value and in another version is a data set which is transferred especially to the evaluation device 3 of the measuring device 1 for storage in the memory unit 8 there.

The evaluation device 3 determines the result value of the flow rate as a measured value of the measured quantity based on the intermediate information.

Altogether, the measuring device 1 measures and acquires intermediate information from the separate data device 10 from the measurement and in turn itself determines the result value as a measured value for the measured quantity which is to be determined.

FIG. 2 schematically shows a progression of individual steps of one alternative implementation of the method in accordance with the invention.

In step 101 measurement information which is dependent on the measured quantity to be measured is obtained from the measuring device.

In step 102 this measurement information is transferred to the data device. There, in step 103, based on the data or formulas stored there, a computation or in general a determination of intermediate information takes place. The intermediate information is transferred back to the measuring device in step 104.

In step 105 the measuring device accesses a secondary sensor device from which secondary measurement information is tapped as additional information about the measurement medium or the process in which the medium is found and in which the measurement is taken.

Based on the intermediate information and the secondary measurement information, in step 106 a result value for the measured quantity to be determined is determined by the measuring device and in step 107 displayed via an on-site display unit.

Inasmuch as the measuring device ascertains that the intermediate information need not be recomputed, for which it generates current measurement information in step 108, a return to step 105 takes place. The interrogation of the secondary sensor device in step 105 and the computation of the current result value in step 106 therefore take place with the current measurement information and the secondary measurement information, but using the intermediate information which continues to apply as an intermediate computation step in the determination of the result value. Therefore, in this configuration, especially also the connection between the measuring device and the data device can only be temporary and need not be maintained for the entire time.

The method is therefore based on the fact that part of the computation or part of the data storage is moved away from the actual measurement device to a separate data device. The result value however is ultimately produced by the measuring device itself so that the connection between the measuring device and the data device can be necessary optionally only for limited time intervals.

What is claimed is:

1. A method for determining a measured quantity, comprising the steps of:

generating a measured value with a measuring device having a sensor device, and an evaluation device and an interface, the measured value being determined by the evaluation device based on measurement information obtained by the sensor device, transferring the measured value from the measuring device to a data device which is separate from the measuring device, using data or formulas stored in the data device for computing intermediate information based on the measured value with the data device, transferring the intermediate information to the measuring device, and using the evaluation device of the measuring device for computing a result value for the measured quantity based on the intermediate information received from the data device.

2. The method in accordance with claim 1, wherein secondary measurement information is generated by a secondary sensor device.

3. The method in accordance with claim 2, wherein the intermediate information is computed based on the secondary measurement information and the measured value.

4. The method in accordance with claim 2, wherein the result value is computed based on the secondary measurement information and the intermediate information.

* * * * *